United States Patent
Glenister et al.

(10) Patent No.: US 11,904,515 B2
(45) Date of Patent: Feb. 20, 2024

(54) AUTOMOTIVE MOLDED-IN-COLOR THERMOPLASTIC POLYOLEFIN WITH CLEAR COATING FOR PAINT REPLACEMENT AND HIGH GLOSS APPLICATIONS

(71) Applicant: LYONDELLBASELL ADVANCED POLYMERS INC., Houston, TX (US)

(72) Inventors: Peter J. Glenister, Milford, MI (US); Quentin R. Boll, Lansing, MI (US); Perry J. Banta, Charlotte, MI (US); Changlai Yang, Okemos, MI (US)

(73) Assignee: LyondellBasell Advanced Polymers Inc., Houston, TX (US)

(*) Notice: Subject to any disclaimer, the term of this patent is extended or adjusted under 35 U.S.C. 154(b) by 321 days.

(21) Appl. No.: 17/193,738

(22) Filed: Mar. 5, 2021

(65) Prior Publication Data

US 2021/0276233 A1    Sep. 9, 2021

Related U.S. Application Data

(60) Provisional application No. 62/986,450, filed on Mar. 6, 2020.

(51) Int. Cl.
| | | |
|---|---|---|
| *C08L 23/12* | (2006.01) | |
| *B29C 45/00* | (2006.01) | |
| *B29K 23/00* | (2006.01) | |
| *B29K 503/08* | (2006.01) | |

(52) U.S. Cl.
CPC ...... *B29C 45/0001* (2013.01); *B29C 45/0013* (2013.01); *B29C 45/0053* (2013.01); *C08L 23/12* (2013.01); *B29C 2045/0079* (2013.01); *B29K 2023/12* (2013.01); *B29K 2023/16* (2013.01); *B29K 2023/18* (2013.01); *B29K 2503/08* (2013.01); *B29K 2995/002* (2013.01); *B29K 2995/0022* (2013.01); *B29K 2995/0063* (2013.01); *B29K 2995/0077* (2013.01); *B29K 2995/0082* (2013.01); *C08L 2205/025* (2013.01); *C08L 2205/03* (2013.01); *C08L 2205/08* (2013.01)

(58) Field of Classification Search
CPC .................................................... C08L 23/12
See application file for complete search history.

(56) References Cited

U.S. PATENT DOCUMENTS

| | | | | |
|---|---|---|---|---|
| 6,541,570 | B2* | 4/2003 | Beccarini | C08F 297/08 |
| | | | | 525/240 |
| 9,902,846 | B2* | 2/2018 | Glenister | C08K 3/00 |
| 10,358,547 | B2* | 7/2019 | Glenister | C08L 23/16 |
| 2010/0099820 | A1* | 4/2010 | Cai | C08J 3/201 |
| | | | | 525/185 |
| 2018/0016428 | A1* | 1/2018 | Glenister | C08L 23/12 |

FOREIGN PATENT DOCUMENTS

| | | |
|---|---|---|
| CN | 1170422 A | 1/1998 |
| CN | 1247210 A | 3/2000 |
| CN | 1344301 A | 4/2002 |
| CN | 1370188 A | 9/2002 |
| CN | 101128547 A | 2/2008 |
| CN | 109476890 A | 3/2019 |
| CN | 113039050 A | 6/2021 |
| WO | 2009045351 A1 | 4/2009 |
| WO | 2020097102 A1 | 5/2020 |

OTHER PUBLICATIONS

International Search Report and Written Opinion dated May 4, 2021 for Corresponding PCT/US2021/021169.

* cited by examiner

*Primary Examiner* — Irina Krylova

(57) ABSTRACT

Molded-in-color thermoplastic polyolefin (TPO) compositions useful for making automotive components, such as injection molded parts, as well as other articles of manufacture are described. The molded-in-color composition has a $\Delta E^*$ value$\leq$2.0 (compared to a painted color master), a gloss measured at 60° from about 76 to about 90 GU, a density ranging from about 0.9 to about 0.97 g/cm$^3$, a melt mass flow rate from about 15 to about 40 g/10 min (ASTM D 1238, 230° C./2.16 kg), a flexural modulus between about 600 to about 2000 MPa, and an as-molded shrinkage between about 0.6% and about 1.4%. The compositions can be used to prepare molded-in-color components that can undergo additional clear coating steps as required by the automotive application. The clear coated molded-in-color components have a gloss measured at 20° from about 85 to about 95 GU and a gloss retention after mar between about 85% and about 93%.

14 Claims, No Drawings

AUTOMOTIVE MOLDED-IN-COLOR THERMOPLASTIC POLYOLEFIN WITH CLEAR COATING FOR PAINT REPLACEMENT AND HIGH GLOSS APPLICATIONS

PRIOR RELATED APPLICATIONS

This application is the Non-Provisional patent application, which claims benefit of priority to U.S. Provisional Application No. 62/986,450, filed Mar. 6, 2020, the contents of which are incorporated herein by reference in their entirety.

FEDERALLY SPONSORED RESEARCH STATEMENT

Not applicable.

REFERENCE TO MICROFICHE APPENDIX

Not applicable.

FIELD OF THE DISCLOSURE

The disclosure relates to polyolefin-based compositions, specifically, polyolefin-based compositions for automotive applications, including injection molded parts.

BACKGROUND OF THE DISCLOSURE

Polyolefins have been frequently used in commercial plastics applications because of their wide ranging physical properties and ease of processing. These polymers can be either amorphous or highly crystalline, and they are able to behave as thermoplastics, thermoplastic elastomers, or thermosets. As such, polyolefins are easily designed and modified for select applications by properly selecting their molecular structure and molecular weight distribution(s) to obtain a suitable balance of stiffness, impact resistance and processability in the extrusion processes.

Thermoplastic polyolefins (TPOs), in particular polypropylene and polyethylene, have enjoyed wide commercial success because of their outstanding performance and cost characteristics. Because of their impact resistance and ability to withstand weather extremes, blends of polypropylene with compatible plastomers and elastomers such as ethylene-α-olefin copolymers have found use in injection molded structures, particularly those in the automotive industry such as grilles, bumpers, spoilers, fascias, and interior panels for automotives, airplanes, and recreational vehicles, as well as other components for water vessels and locomotives.

The most critical problem perceived by the automobile manufacturers about the use of TPOs on automobiles and other vehicles is the difficulties encountered in painting them. TPOs have an extremely low surface energy and most conventional automotive paints do not wet the TPO's surface or adhere to the TPO. This is especially problematic for automotive components such as accent trims and grilles as auto manufactures seek vibrant colors in a high gloss, sleek finish. Further, these automotive components must be weatherable, as well as provide excellent resistance to scratch and marring.

Achieving a high gloss TPO component via painting involves several processing steps which adds time, labor, and additional cost. The TPO resin is injection molded to the size and shape of the final component part before being primed with an adhesion promoter to improve the adhesion of the paint to the substrate. Multiple layers of a base coat are then applied, which provides the final color of the component, followed by a protective clear coat. The component is then baked to cure the paint system. This method of coloring a TPO component allows for a wide range of colors and glosses, excellent scratch and mar resistance, and superb weatherability. However, the sheer number of processing steps and coats needed to achieve the color and gloss are time consuming. Further, if the paint is chipped or scratched, the color of the underlying resin is revealed and would be aesthetically displeasing as well as hard to repair and color match.

Due the sheer number of polyolefin-based components on vehicles (for example, spare-wheel compartment covers, panels, seat backrests, spoilers, bumper fascia, rear panel shelves, and door trim panels), automotive manufacturers have attempted to reduce the labor-intensive painting process steps by molding TPOs resins loaded with pigmentation. With these pre-colored resins, the desired color appears not only on the surface of the component but throughout the molded substrate which forms the component. These molded-in-color TPOs lack the high gloss required by the automotive industry, thus steps for adding gloss to the pre-colored components are still needed. Additionally, extreme colors such as Piano Black or a metallic paint match are difficult to achieve with pre-colored resin and still have to be painted onto the molded substrate.

Therefore, there is a continuing need to develop quicker methods of producing polyolefin-based components that have a high enough gloss and can have the same depth of color as painted polyolefin-based components. These components should have the scratch and mar resistance needed for automotive applications on the sea, land and air, while reducing the cost of manufacturing the final molded component.

SUMMARY OF THE DISCLOSURE

The present disclosure is directed to new thermoplastic polyolefin (TPO) based compositions that address the need for high gloss, injection molded-in-color automotive parts that can be color matched to painted TPOs, while retaining the density, flexural modulus, notched Izod impact strength, melt mass flow rate (MFR), tensile strength at yield, and/or as-mold shrinkage properties required by the automotive industry. Methods of forming the articles from such compositions and applying clear coats to further improve the gloss, durability, scratch and mar resistance are also described.

The present disclosure includes any of the following embodiments in any combination(s) of one or more thereof:

A molded-in-color composition having (a) a polyolefin resin composition; (b) at least one elastomer; (c) an additive package and (d) a colorant package, wherein the molded-in-color composition has a $\Delta E^*$ value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, and an as-molded shrinkage between about 0.6% and about 1.4%.

A molded-in-color composition having (a) a polyolefin resin composition present in an amount that ranges from about 50 wt % to about 80 wt %, based on a total weight of the molded-in-color composition; (b) at least one elastomer, wherein the total amount of elastomer present is in an amount that ranges from about 5 wt % to about 25 wt %, based on a total weight of the molded-in-color composition; (c) an additive package present in an amount that ranging from greater than 0 wt % to about 2 wt %, based on a total weight of the molded-in-color composition; and (d) a colorant package present in an amount that ranging from greater than 0 wt % to about 5 wt %, based on a total weight of the molded-in-color composition, wherein the molded-in-color composition has a ΔE* value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, and an as-molded shrinkage between about 0.6% and about 1.4%.

A molded-in-color composition having (a) a polyolefin resin composition; (b) at least one elastomer; (c) an additive package, (d) a colorant package, and (e) a mineral filler present in an amount up to 7% of the total weight of the molded-in-color composition, wherein the molded-in-color composition has a ΔE* value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, and an as-molded shrinkage between about 0.6% and about 1.4%.

A molded-in-color composition having (a) a polyolefin resin composition present in an amount that ranges from about 50 wt % to about 80 wt %, based on a total weight of the molded-in-color composition; (b) at least one elastomer, wherein the total amount of elastomer present is in an amount that ranges from about 5 wt % to about 25 wt %, based on a total weight of the molded-in-color composition; (c) an additive package present in an amount that ranging from greater than 0 wt % to about 2 wt %, based on a total weight of the molded-in-color composition; (d) a colorant package present in an amount that ranging from greater than 0 wt % to about 5 wt %, based on a total weight of the molded-in-color composition; and (e) a mineral filler present in an amount up to 7% of the total weight of the molded-in-color composition, wherein the molded-in-color composition has a ΔE* value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, and an as-molded shrinkage between about 0.6% and about 1.4%.

A molded-in-color composition having (a) a polyolefin resin composition; (b) at least one elastomer; (c) an additive package, (d) a colorant package, and (e) a compatibilizer composition present in an amount up to 25% of the total weight of the molded-in-color composition, wherein the molded-in-color composition has a ΔE* value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, and an as-molded shrinkage between about 0.6% and about 1.4%.

A molded-in-color composition having (a) a polyolefin resin composition present in an amount that ranges from about 50 wt % to about 80 wt %, based on a total weight of the molded-in-color composition; (b) at least one elastomer, wherein the total amount of elastomer present is in an amount that ranges from about 5 wt % to about 25 wt %, based on a total weight of the molded-in-color composition; (c) an additive package present in an amount that ranging from greater than 0 wt % to about 2 wt %, based on a total weight of the molded-in-color composition; (d) a colorant package present in an amount that ranging from greater than 0 wt % to about 5 wt %, based on a total weight of the molded-in-color composition; and (e) a compatibilizer composition present in an amount up to 25% of the total weight of the molded-in-color composition, wherein the molded-in-color composition has a ΔE* value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, and an as-molded shrinkage between about 0.6% and about 1.4%.

A molded-in-color composition having (a) a polyolefin resin composition; (b) at least one elastomer; (c) an additive package, (d) a colorant package, (e) a mineral filler present in an amount up to 7% of the total weight of the molded-in-color composition, and (f) a compatibilizer composition present in an amount up to 25% of the total weight of the molded-in-color composition, wherein the molded-in-color composition has a ΔE* value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, and an as-molded shrinkage between about 0.6 and about 1.4%.

A molded-in-color composition having (a) a polyolefin resin composition present in an amount that ranges from about 50 wt % to about 80 wt %, based on a total weight of the molded-in-color composition; (b) at least one elastomer, wherein the total amount of elastomer present is in an amount that ranges from about 5 wt % to about 25 wt %, based on a total weight of the molded-in-color composition; (c) an additive package present in an amount that ranging from greater than 0 wt % to about 2 wt %, based on a total weight of the molded-in-color composition; (d) a colorant package present in an amount that ranging from greater than 0 wt % to about 5 wt %, based on a total weight of the molded-in-color composition; (e) a mineral filler present in an amount up to 7% of the total weight of the molded-in-color composition, and (f) a compatibilizer composition present in an amount up to 25% of the total weight of the molded-in-color composition, wherein the molded-in-color composition has a ΔE* value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, and an as-molded shrinkage between about 0.6% and about 1.4%.

A method of forming an article comprising melt blending a molded-in-color composition having a polyolefin composition comprising at least one polyolefin, wherein the total amount of the polyolefin composition present in the composition ranges from about 50 wt % to about 80 wt %, based on a total weight of the composition; at least one elastomer, wherein the total amount of elastomer present in the composition ranges from about 5 wt % to about 25 wt %, based on a total weight of the composition; an additive package present in an amount ranging from greater than 0 wt % to about 2 wt %, based on a total weight of the composition; and a colorant package present in an amount ranging from greater than 0 wt % to about 5 wt %, based on a total weight of the composition. The melt blended molded-in-color composition is then molded into an article with a gloss measured at 60° from about 76 to about 90 GU. The molded-in-color composition has a ΔE* value≤2.0 (compared to a painted color master), a density ranging from about 0.9 to about 0.97 g/cm$^3$, a melt mass flow rate from about 15 to about 40 g/10 min (ASTM D 1238, 230° C./2.16 kg), a flexural modulus between about 600 to about 2000 MPa, and an as-molded shrinkage between about 0.6 and about 1.4%.

A method of forming an article comprising melting blending a molded-in-color composition comprising a polyolefin composition comprising a first polyolefin having a high MFR that is from about 50 to about 200 g/10 min (ASTM D 1238, 230° C./2.16 kg), and a second polyolefin has a low MFR that is from about 1 to about 5 g/10 min (ASTM D 1238, 230° C./2.16 kg), wherein the total amount of thermoplastic polyolefin present in the composition ranges from about 50 wt % to about 80 wt %, based on a total weight of the composition; at least one elastomer, wherein the total amount of elastomer present in the composition ranges from about 5 wt % to about 25 wt %, based on a total weight of the composition; at least one compatibilizer, wherein the total amount of compatibilizer present in the composition ranges from about 5 wt % to about 15 wt %, based on a total weight of the composition; an additive package present in an amount ranging from greater than 0 wt % to about 2 wt %, based on a total weight of the composition; and a colorant package present in an amount ranging from greater than 0 wt % to about 5 wt %, based on a total weight of the composition. The melt blended molded-in-color composition is then molded into an article with a gloss measured at 60° from about 76 to about 90 GU. The molded-in-color composition has a ΔE* value≤2.0 (compared to a painted color master), a density ranging from about 0.9 to about 0.97 g/cm$^3$, a melt mass flow rate from about 15 to about 40 g/10 min (ASTM D 1238, 230° C./2.16 kg), a flexural modulus between about 600 to about 2000 MPa, and an as-molded shrinkage between about 0.6 and about 1.4%.

Any of the above methods further comprising the step of priming the article and coating the primed article with a clear coat, wherein the clear coated article has a gloss measured at 20° from about 85 to about 95 GU and a gloss retention after mar between about 85% and about 93%.

Any of the above molded-in-color compositions or methods of producing an article, wherein the polyolefin resin compositions comprises a first polyolefin having a high MFR that is from about 50 to about 200 g/10 min (ASTM D 1238, 230° C./2.16 kg), and a second polyolefin has a low MFR that is from about 1 to about 5 g/10 min (ASTM D 1238, 230° C./2.16 kg).

Any of the above molded-in-color compositions or methods of producing an article, wherein the polyolefin resin compositions comprise a homopolymer or copolymer with a MFR between 15 and 34 g/10 min (ASTM D 1238, 230° C./2.16 kg).

Any of the above molded-in-color compositions or methods of producing an article, wherein a mineral filler present in an amount up to 7 wt % of the total composition weight.

Any of the above molded-in-color compositions or methods of producing an article, wherein at least one compatibilizer is present in an amount of greater than 0 to about 25 wt % of the total composition weight.

Any of the above molded-in-color compositions or methods of producing an article, wherein the compatibilizer composition comprises a first styrene-ethylene/butylene-styrene copolymer, and/or a second styrene-ethylene/butylene-styrene copolymer is present.

Any of the above molded-in-color compositions or methods of producing an article, further comprising both a mineral filler present in an amount up to 7 weight percent of the total composition weight and a compatibilizer composition in an amount of greater than 0 to 25 wt % of the total composition weight.

Any of the above molded-in-color compositions or methods of producing an article, wherein the molded-in-color composition has a tensile strength at yield from about 16 to about 26 MPa.

Any of the above molded-in-color compositions or methods of producing an article, wherein the molded-in-color composition has a notched Izod at 23° C. (ISO 180) from about 20 to about 50 kJ/m$^2$.

Any of the above molded-in-color compositions or methods of producing an article, wherein the molded-in-color composition has a notched Izod at 0° C. (ISO 180) from about 4 to about 20 kJ/m$^2$.

Any of the above molded-in-color compositions or methods of producing an article, wherein the molded-in-color composition has a notched Izod at −40° C. (ISO 180) from about 2 to about 6 kJ/m$^2$.

An article formed from any of the above compositions, wherein the article is part of an automobile. Alternatively, an article formed from any of the above compositions, wherein the article is part of an automobile and has a clear coat.

An article formed from any of the above methods, wherein the article is a part for an automobile.

The present disclosure further comprises articles made from any of the above novel mold-in-color compositions, and methods of making such, wherein the article may be used as parts for water vessels, locomotives, recreational vehicles, or airplanes.

Once the articles are formed, the surface of the article can be primed with a transparent adhesion promoter before coating with a clear coat or can be flame treated to thermally oxidize the surface to improve adherence of the clear coat. A clear coat can be applied to the outer surface of the articles to increase the gloss of the article to a range between about 85 and about 95 GU (at 20°) as well as provides additional durability. The clear coat also improves the scratch and mar resistance to a level that is achieved with traditional paint systems including adhesion. Even after mar, the coated articles can retain at least 85% gloss.

While multiple embodiments are disclosed, still other embodiments will become apparent to those skilled in the art from the following detailed description. As will be apparent, certain embodiments, as disclosed herein, are capable of modifications in various aspects, all without departing from the spirit and scope of the claims as presented herein. Accordingly, the detailed description is to be regarded as illustrative in nature and not restrictive.

DEFINITIONS

As used herein, the term "α-olefin" or "alpha-olefin" means an olefin of the general formula $CH_2=CH-R$, wherein R is a linear or branched alkyl containing from 1 to 10 carbon atoms. The α-olefin can be selected, for example, from propylene, 1-butene, 1-pentene, 1-hexene, 1-octene, 1-dodecene and the like.

The terms "monomer" and "comonomer" are used interchangeably. The terms mean any compound with a polymerizable moiety that is added to a reactor in order to produce a polymer. In those instances, in which a polymer is described as comprising one or more monomers, e.g., a polymer comprising propylene and ethylene, the polymer comprises units derived from the monomers, e.g., —$CH_2$—$CH_2$—, and not the monomer itself, e.g., $CH_2$=$CH_2$.

As used herein the term "polymer" means a macromolecular compound prepared by polymerizing monomers of the same or different type. The term "polymer" includes homopolymers, copolymers (including block and random), terpolymers, interpolymers, and so on.

As used herein, the term "polymer composition" refers to a composition made from and/or containing at least one polymer.

As used herein, the term "elastomer" refers to polymer compounds having rubber-like properties and crystallinity in the range of from about 0 percent to about 20 percent. In some embodiments, the polymer can have crystallinity in the range of from about 0 percent to about 5 percent.

As used herein, the term "impact-modifying compatibilizer" is used interchangeable with "compatibilizer" and means a compound that synergistically interacts with the interface of the elastomeric ethylene copolymer composition and the polyolefin to improve the properties of the overall composition.

As used herein, the term "thermoplastic polymer" means a polymer that softens when exposed to heat and returns to its original condition when cooled to room temperature.

As used herein, the term "homopolymer" and similar terms mean a polymer consisting solely or essentially of units derived from a single kind of monomer, e.g., ethylene homopolymer is a polymer comprised solely or essentially of units derived from ethylene, and propylene homopolymer is a polymer comprised solely or essentially of units derived from propylene, and the like.

As used herein the term "interpolymer" refers to a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

As used herein, the term "block copolymer" refers to two or more strands (blocks) of different polymers chemically attached to each other.

As used herein, the term "olefin" refers to an alkene wherein at least one carbon-carbon double bond in the molecule is a terminal double bond. Some non-limiting examples of olefins include styrene, ethylene, propylene, butene, pentene, hexene, heptene, octene, nonene, decene, or dodecene.

As used herein, the term "polyolefin" includes polymers such as polyethylene, polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes, including batch and continuous processes using single, staged or sequential reactors, slurry, solution, and fluidized bed processes and one or more catalysts including for example, heterogeneous and homogeneous systems and Ziegler-Natta, Phillips, metallocene, single-site, and constrained geometry catalysts to produce polymers having different combinations of properties. Such polymers may be highly branched or substantially linear and the branching, dispersity and average molecular weight may vary depending upon the parameters and processes chosen for their manufacture in accordance with the teachings of the polymer arts.

As used herein, the term "polyolefin resin composition" refers to a composition made from and/or containing at least one polyolefin.

In the present description, the term "crystalline" in reference to a polyolefin means an olefinic polymer having a crystallinity of more than about 70 weight percent and less than about 93 weight percent, based upon the total weight of the olefinic polymer.

In the present description, the term "highly crystalline" in reference to a polyolefin means an olefinic polymer having a crystallinity of greater than about 93 weight percent, based upon the total weight of the olefinic polymer.

In the present description, the term "semi-amorphous" in reference to a polyolefin means an olefinic polymer having a crystallinity of from about 5 to about 30 weight percent, based upon the total weight of the olefinic polymer.

In the present description, the term "semicrystalline" in reference to a polyolefin means an olefinic polymer having a crystallinity of more than about 30 weight percent and less than about 70 weight percent, based upon the total weight of the olefinic polymer.

As used herein, the term "high melt flow rate" in reference to a polyolefin is defined herein as having a melt mass flow rate ranging from about 50 to about 200 g/10 min (2.16 kg at 230° C.). The term "low melt flow rate" in reference to a polyolefin is defined herein as having a melt mass flow rate ranging from about 1 to 5 g/10 min (2.16 kg at 230° C.).

As used herein, the term "masterbatch" refers to premixed compositions that have one or more solid or liquid additive in a carrier resin, wherein the additives are used to impart other properties to the polyolefin. One or more masterbatches can be used to introduction some or all of the additives into the polyolefin blend.

The terms "parts" and "articles" are used interchangeable herein to refer to final or semi-final molded components for use on e.g. automotive vehicles such as automobiles, recreational vehicles, water vessels, and airplanes.

In the present description, the term "mold-in-color", and its past tense "molded-in-color", refers to mixing and kneading a colorant directly with a polymeric composition to provide a desired color to an article molded from the polymeric composition.

As used herein, the term "colorant" refers to a dye, pigment, or other substance that imparts color to the polymeric composition and subsequent articles, and includes substances that impart metallic or pearlescent effects.

As used herein, the term "room temperature" refers to a temperature around 23 degrees Celsius (unless it is defined differently in an ASTM, in which case "room temperature" means as it is defined within that ASTM for that particular test/procedure/method).

The use of the word "a" or "an," when used in conjunction with the term "comprising" in the claims and/or the specification, may mean "one," but it is also consistent with the meaning of "one or more," "at least one," and "one or more than one."

Throughout this application, the term "about" is used to indicate that a value includes the variation of error for the device, the method being employed to determine the value, or the variation that exists among the studies. The variation of error is plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The phrase "consisting of" is closed, and excludes all additional elements.

The phrase "consisting essentially of" excludes additional material elements, but allows the inclusions of non-material elements that do not substantially change the nature of the invention.

A "method" is a series of one or more steps undertaken that lead to a final product, result or outcome. As used herein, the word "method" is used interchangeably with the word "process."

Color differences between the compositions and/or articles described herein and a standard are defined using Commission Internationale de l'Eclairage (CIE) L*a*b* Coordinates. L* indicates lightness, a* is the red/green coordinate, and b* is the yellow/blue coordinate. Deltas for L* (ΔL*), a* (Δa*) and b* (Δb*) may be positive (+) or negative (−):

ΔL* (L* sample minus L* standard)=difference in lightness and darkness (+=lighter, −=darker)

Δa* (a* sample minus a* standard)=difference in red and green (+=redder, −=greener)

Δb* (b* sample minus b* standard)=difference in yellow and blue (+=yellower, −=bluer)

The total difference between the compositions and/or articles and the standard is defined as Delta E (ΔE*) and is calculated using the following:

$$\Delta E^* = \sqrt{\Delta L^{*2} + \Delta a^{*2} + \Delta b^{*2}}$$

The standards used for the color difference can include molded TPOs that are painted per automotive manufacturers specifications and/or color masters.

The above definitions supersede any conflicting definition in any reference that is incorporated by reference herein. The fact that certain terms are defined, however, should not be considered as indicative that any term that is undefined is indefinite. Rather, all terms used are believed to describe the appended claims in terms such that one of ordinary skill can appreciate.

The following abbreviations are used herein:

| ABBREVIATION | TERM |
| --- | --- |
| CIE | Commission Internationale de l'Eclairage |
| GU | Gloss units |
| MFR | Melt flow mass range |
| OEMS | original equipment manufacturer |
| SEBS | Styrene-ethylene/butylene-styrene block copolymer |
| TPO | Thermoplastic polyolefin |
| wt % | Weight percent |

Test Methods

The components of the compositions disclosed herein, the compositions themselves, and the resulting molded articles were tested and analyzed using one or more of the following test methods:

Melt mass flow rates (MFR) are given in gram/10 min (g/10 min) and were measured using ASTM D 1238, which is entitled "Test Method for Melt Flow Rates of Thermoplastics by Extrusion Plastometer," under the conditions specified below. The term "ASTM D 1238" as used herein refers to a standard test method for determining melt flow rates of thermoplastics carried out by an extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Aug. 1, 2013 and published in August 2013, the contents of which are incorporated herein by reference in its entirety. For the referenced ASTM standards, visit the ASTM website, www.astm.org, or contact ASTM Customer Service at service@astm.org.

Filler or ash content is given in percentage (%) and measured using ISO 3451-1, which is entitled "Plastics—Determination of Ash—Part 1: General Methods" and published in February 2019. The term "ISO 3451-1" as used herein refers to a standard test method for determination of the ash of a range of plastics (resins and compounds). The particular conditions chosen may be included in the specifications for the plastic material in question.

Density is giving in $g/cm^3$ and measured using ISO 1183-1, which is entitled "Plastics-Methods for Determining the Density of Non-Cellular Plastics—Part 1: Immersion method, liquid pycnometer method and titration method." The term "ISO 1183-1" as used herein refers to the test method published as the second edition dated May 15, 2012, the content of which are incorporated herein by reference in its entirety.

Flexural modulus (or "flex modulus") is given in megapascals (MPa) and measured using ISO 178, which is entitled "Plastics—Determination of flexural properties." The term "ISO 178" as used herein refers to the test method published as the fifth edition dated Dec. 15, 2010, the content of which are incorporated herein by reference in its entirety.

Heat Deflection Temperature (or "HDT") is given in Celsius (° C.) and measured using ISO 75, which is entitled "Plastics—Determination of temperature of deflection under load." The term "ISO 75" as used herein refers to the test methods published in April 2013, the content of which are incorporated herein by reference in its entirety. The ISO 75 test methods determine the temperature of deflection under load (flexural stress under three-point loading) of plastics. Different types of test specimen and different constant loads are defined to suit different types of material. ISO 75-2 gives specific requirements for plastics (including filled plastics and fiber-reinforced plastics in which the fiber length, prior to processing, is up to 7.5 mm) and ebonite, while ISO 75-3 gives specific requirements for high-strength thermosetting laminates and long-fiber-reinforced plastics in which the fiber length is greater than 7.5 mm. The methods specified are for assessing the relative behavior of different types of material at elevated temperature under load at a specified rate of temperature increase. The results obtained do not necessarily represent maximum applicable temperatures because in practice essential factors, such as time, loading conditions and nominal surface stress, can differ from the test conditions. True comparability of data can be achieved for materials having the same room-temperature flexural modulus.

Tensile Strength at Yield is given in megapascals (MPa) and measured using ISO 527-1:2012, which is entitled "Plastics—Determination of tensile properties." The term "ISO 527" as used herein refers to the test method published in February 2012, the content of which are incorporated herein by reference in its entirety. The ISO 527 test methods are for determining the tensile properties of plastics and plastic composites under defined conditions. Several different types of test specimen are defined to suit different types of material. The methods are used to investigate the tensile behavior of the test specimens and for determining the tensile strength, tensile modulus and other aspects of the tensile stress/strain relationship under the conditions defined.

Another method for testing tensile strength is provided by ASTM D 412, which is entitled "Test Methods for Vulcanized Rubber and Thermoplastic Elastomers—Tension." The term "ASTM D 412" as used herein refers to the standard test method to evaluate the tensile (tension) properties of vulcanized thermoset rubbers and thermoplastic elastomers. The deters determination of tensile properties starts with test pieces taken from the sample material and includes the preparation of the specimens and the testing of the specimens. Specimens may be in the shape of dumbbells, rings or straight pieces of uniform cross-sectional area. Measurements for tensile stress, tensile stress at a given elongation, tensile strength, yield point, and ultimate elongation are made on specimens that have not been prestressed. Tensile stress, yield point, and tensile strength are based on the original cross-sectional area of a uniform cross-section of the specimen. Measurement of tensile set is made after a previously unstressed specimen has been extended and allowed to retract by a prescribed procedure. Measurement of "set after break" is also described. This test method was approved on Dec. 10, 2002 and published January 2003, the contents of which are incorporated herein by reference in its entirety. For the referenced ASTM standards, visit the ASTM website, www.astm.org, or contact ASTM Customer Service at service@astm.org.

The notched Izod impact strength is given in Jim or $kJ/m^2$ and is measured using ISO 180, which is entitled "Determination of Izod Impact Strength." The term "ISO 180" as used herein refers to the test method for determining the Izod impact strength of plastics under defined conditions. A number of different types of specimen and test configurations are defined. Different test parameters are specified according to the type of material, the type of test specimen and the type of notch.

The as-molded shrinkage is given in percentage (%) and measured using ISO 294, which is entitled "Plastics—Injection moulding of test specimens of thermoplastic materials. Part 4: Determination of moulding shrinkage." The term "ISO 294" herein refers to the test method for determining the moulding shrinkage and post-moulding shrinkage of injection-moulding test specimens of thermoplastic materials in the directions parallel to and normal to the direction of melt flow. The Applicant deviates slightly from the ISO 294 method. Whereas ISO 294 requires a 60 mm×60 mm×2 mm plate specimen to be measured using calipers, the Applicant molds 4"×6"×3.2 mm plaques and measures the average shrinkage using a modified specimen holder.

Gloss is given in gloss units (GU) and measured using ASTM D 2457 which is entitled "Standard Test Method for Specular Gloss of Plastic Films and Solid Plastics". The term "ASTM D 2457" herein refers to the test method for determining the gloss for test specimens as compared to a black glass standard. The gloss can be measured at a specular angle of 20°, 60° and/or 85°.

The color for each composition and/or article was measuring using a X-Rite Ci7800 Spectrophotometer (SN 001570). The color for each composition and/or article is provided by the CIE color coordinates.

The mar resistance is measured using FLTM BI 161-01, which is entitled "Mar Resistance Determination for Automotive Coatings". The term "FLTM BI 161-01" as used herein refers to the standard test method for determining the mar resistance for automotive coatings and mold-in-color plastics. In general, this test method covers the evaluation of gloss retention of a TPO sample after abrasion with a polishing cloth. The test specimen will have the gloss measured at either 20° or 60° prior to abrasion. The surface will then be abraded with a polishing cloth using a crockmeter for 10 double-strokes. After abrasion the gloss is remeasured on the abraded surface and gloss retention is calculated.

DESCRIPTION OF EMBODIMENTS OF THE DISCLOSURE

The automotive industry uses many decorative parts made from thermoplastic polyolefin-based compositions for exterior styling and performance applications. The thermoplastic polyolefin-based compositions for the decorative parts may be molded to the desired shape followed by painting or made according to a molded-in-color process. Painting the molded parts achieve a smooth, high gloss, richer "high end" look. However, painting adds a second step to the manufacturing process, adds significant cost to the part, typically sacrifices impact performance, and creates environmental VOC concerns during the application process.

As such, interest has increased in the molded-in-color process. During the compounding process, one or more colorants are added to the thermoplastic polyolefin-based compositions before molding to provide the aesthetic color. While the molded-in-color method is the most cost-effective method to produce an article with color, the resulting articles often have lower gloss and a "plastic" look which may be regarded as "cheap". Further, molded-in-color articles are not able to achieve the same depth of color as the painted TPOs, especially for the extreme colors such as Piano Black or metallic effects. Further, TPO resins intended for use in molded parts that are to be painted cannot achieve the appearance of the painted TPOs, for example color depth and gloss target, when used in molded-in-color compositions.

The resulting molded-in-color article is also susceptible to UV radiation damaging even if a UV stabilizer is incorporated into the base resin. A problem with UV stabilizers in the substrate is that the concentration of stabilizers needed to constitute major protection against UV deterioration seriously affects the ability of paint or clear coats to adhere to the article. U.S. Pat. No. 5,037,680 describes a process for coating molded-in-color articles for use as exterior automotive components with a clear coat that has UV screeners that extend the life of the underlying substrate. While this adds a protective layer to the molded-in-color article, it does not address other issues such as the low gloss and inability to achieve the same color depth as the painted TPOs.

Provided herein are novel thermoplastic polyolefin-based, molded-in-color compositions that have a high gloss (>70 GU at 60°), melt mass flow rate from about 15 to about 40 g/10 min (230° C., 2.16 kg), a density from about 0.88 to about 0.95 g/cm³, a flexural modulus from about 1000 to about 2000 MPa, an as-molded shrinkage between about 0.7 and about 1.15%, and the ability to be color matched to painted TPOs. These molded-in-color compositions can also have a tensile strength at yield from about 20 to about 26 MPa.

These thermoplastic polyolefin-based compositions are useful as components for automobiles, water vessels, locomotives, recreational vehicles, airplanes and other products, including, for example, injection molded parts. In some embodiments, these compositions (resins) allow for the preparation of molded-in-color parts such as bumper covers, door claddings, rocker moldings and the like with the automotive manufacturers' high gloss and physical property requirements.

The molded-in-color components can also be primed and coated with a clear coat to further improve the gloss and scratch and mar resistance, as well as improved weatherability and improved gloss retention of the article after being subjected to marring.

In various embodiments, the compositions and methods described herein provide an achievable level of color that mimics the painted TPOs while retaining the physical properties (gloss, durability, MFR, density, flexural modulus, and as-molded shrinkage) that are acceptable to auto manufactures.

In more detail, the compositions described herein may include: (1) a polyolefin resin composition; (2) at least one elastomer; (3) an additives package; and (4) a colorant package. The compositions may be described as molded-in-color TPO compositions and may further include compatibilizers and fillers while also retaining the physical properties (gloss, durability, MFR, density, flexural modulus, and as-molded shrinkage) that are acceptable to auto manufactures.

In one aspect of the present disclosure, there are provided compositions comprising:
(a) a polyolefin resin composition;
(b) at least one elastomer;
(c) an additives package; and
(d) a colorant package with one or more colorants.

In another aspect of the present disclosure, there are provided compositions comprising:
(a) a polyolefin resin composition, wherein the polyolefin resin composition comprises
  (i) a polypropylene homopolymer having a high melt flow rate that is from about 50 to about 200 g/10 min,
  (ii) a polypropylene homopolymer having a low melt flow rate that is from about 1 to about 5 g/10 min, and
(b) at least one elastomer;
(c) an additives package, wherein the additives package comprises one or more of antioxidants, UV light stabilizers, anti-scratch agents, and/or acid scavengers; and
(d) a colorant package, wherein the colorant package comprises one or more dyes and/or pigments.

In another aspect of the present disclosure, there are provided compositions comprising:
(a) a polyolefin resin composition, wherein the thermoplastic polyolefin resin composition comprises
  (i) a polypropylene homopolymer having a high melt flow rate that is from about 50 to about 200 g/10 min,
  (ii) a polypropylene homopolymer having a low melt flow rate that is from about 1 to about 5 g/10 min, and
(b) at least one elastomer;
(c) a compatibilizer composition, wherein the compatibilizer composition comprises
  (i) a first styrene-ethylene/butylene-styrene copolymer, and/or
  (ii) a second styrene-ethylene/butylene-styrene copolymer;
(d) an additives package, wherein the additives package comprises one or more of antioxidants, UV light stabilizers, anti-scratch agents, and/or acid scavengers; and
(e) a colorant package, wherein the colorant package comprises one or more dyes and/or pigments.

In another aspect of the present disclosure, there are provided compositions comprising:
(a) a polyolefin resin composition, wherein the thermoplastic polyolefin resin composition comprises
  (i) a polypropylene homopolymer having a high melt flow rate that is from about 50 to about 200 g/10 min,
  (ii) a polypropylene homopolymer having a low melt flow rate that is from about 1 to about 5 g/10 min, and
(b) at least one elastomer;
(c) an additives package, wherein the additives package comprises one or more of antioxidants, UV light stabilizers, anti-scratch agents, and/or acid scavengers;
(d) a colorant package, wherein the colorant package comprises one or more dyes and/or pigments; and,
(e) one or more mineral fillers, wherein the amount of fillers present in the composition is up to about 7 wt % based on the total weight of the composition.

In yet another aspect of the present disclosure, there are provided compositions comprising:
(a) a polyolefin resin composition, wherein the thermoplastic polyolefin resin composition comprises
  (i) a polypropylene homopolymer having a high melt flow rate that is from about 50 to about 200 g/10 min,
  (ii) a polypropylene homopolymer having a low melt flow rate that is from about 1 to about 5 g/10 min, and
(b) at least one elastomer;
(c) a compatibilizer composition, wherein the compatibilizer composition comprises
  (i) a first styrene-ethylene/butylene-styrene copolymer, and/or
  (ii) a second styrene-ethylene/butylene-styrene copolymer;
(d) an additives package, wherein the additives package comprises one or more of antioxidants, UV light stabilizers, anti-scratch agents, and/or acid scavengers;
(e) a colorant package, wherein the colorant package comprises one or more dyes and/or pigments; and,
(f) one or more mineral fillers, wherein the amount of fillers present in the composition is up to about 7 wt % based on the total weight of the composition.

In some embodiments, the composition contains a polyolefin resin composition in an amount ranging from about 50 to about 80 wt %, based on the total weight of the composition. In some embodiments, the composition contains a polyolefin resin composition in an amount ranging from about 50 to about 75 wt %; alternatively from about 70 to about 80 wt %; alternatively from about 60 to about 70 wt %; and alternatively from about 60 to about 75 wt %, based on the total weight of the composition. In some embodiments, the polyolefin resin composition contains one or more polyolefins, and can include homopolymers, copolymers, terpolymers, and other interpolymers.

In some embodiments, the composition contains at least one elastomer, wherein the total amount ranges from about 5 to about 25 wt %, based on the total weight of the composition. In some embodiments, the composition contains an elastomer composition in an amount ranging from about 5 to about 14 wt %; alternatively from about 17 to about 25 wt %; alternatively from about 10 to about 20 wt %; and alternatively about 6 wt % or 25 wt %, based on the total weight of the composition. In some embodiments, the elastomer contains one or more polyolefins, and can include ethylene-based homopolymers and copolymers comprising alpha olefin-derived units such as propylene and butene.

In some embodiments, the composition contains one or more colorants in an amount ranging from greater than 0 to about 5 wt %, based on the total weight of the composition. In some embodiments, the composition contains one or more colorants in a combined amount ranging from about 0.4 to about 3 wt %; alternatively from about 2.5 to about 5 wt %; and alternatively from about 0.4 to about 0.8 wt %, based on the total weight of the composition.

In some embodiments, the composition may contain one or more additives in an additive package. The additive package is present in an amount ranging from about greater than 0% to about 2 wt %, based on the total weight of the composition, or any amount or range therein. The additives package can include antioxidants, UV light stabilizers, anti-scratch agents, and/or acid scavengers. For automotive applications, the additive package can include an UV light stabilizer to aid in reducing degradation from UV radiation.

In some embodiments, the composition contains an impact-modifying compatibilizer composition. When a compatibilizer composition is incorporated into the composition, the compatibilizer composition is present in an amount ranging from about 5 to about 20 wt %; alternatively from about 5 to about 14 wt %; alternatively from about 13 to about 20 wt %; alternatively from about 10 to about 20 wt %; and alternatively about 5 wt % or 19 wt %, based on the total weight of the composition, or any amount or range therein. In some embodiments, the compatibilizer composition contains one or more styrene-based copolymers.

In some embodiments, the composition may contain one or more mineral filler. When mineral fillers are incorporated into the composition, the one or more mineral fillers may be present in an amount ranging from about greater than 0% to about 2 wt %, based on the total weight of the composition, or any amount or range therein.

Melt Mass Flow Rate

In some embodiments, the molded-in-color thermoplastic polyolefin-based composition has a melt mass flow rate (MFR, ASTM D 1238, 230° C., 2.16 kg unless otherwise noted) from about 15 g/10 min to about 40 g/10 min; alternatively from about 28 g/10 min to about 33 g/10 min; and alternatively from about 29 g/10 min to about 32 g/10 min. In specific embodiments, the molded-in-color thermoplastic polyolefin-based composition has a melt mass flow rate (MFR, ASTM D 1238, 230° C., 2.16 kg) of 15, 18, 20, 22, 25, 27, 28, 29, 30, 31, 32, 33, 34, 35, 37 or 40 g/10 min.

Ash Content

In some embodiments, the molded-in-color thermoplastic polyolefin-based composition has an ash content (ASTM D3451) from about 0 to 10 wt %; alternatively from about 0.001 to about 2.75 wt %; alternatively from about 0.01 to about 5 wt %; alternatively from about 5 to about 10.0 wt %; alternatively from about 2.5 to about 7.5 wt %; alternatively from about 0.001 to about 1.5 wt %; alternatively from about 0.001 to about 2.5 wt %; alternatively from about 5 to about 7 wt %; alternatively from about 0.001 to about 0.5 wt %; alternatively from about 0.001 to about 0.25 wt %; alternatively from about 0.001 to about 0.1 wt %; and alternatively from about 0.001 to about 0.01 wt %. All wt % values are based on the total weight of the molded-in-color thermoplastic polyolefin-based composition.

Density

In some embodiments, the molded-in-color thermoplastic polyolefin-based composition has a density (ISO 1183) from about 0.89 g/cm$^3$ to about 0.97 g/cm$^3$. In some of these embodiments, the composition has a density from about 0.89 g/cm$^3$ to about 0.91 g/cm$^3$; alternatively from about 0.92 g/cm$^3$ to about 0.97 g/cm$^3$; and alternatively from about 0.89 g/cm$^3$ to about 0.94 g/cm$^3$. In specific embodiments, the composition has a density of about 0.89 g/cm$^3$, 0.90 g/cm$^3$, 0.91 g/cm$^3$, 0.92 g/cm$^3$, 0.93 g/cm$^3$, 0.94 g/cm$^3$, 0.95 g/cm$^3$, 0.96 g/cm$^3$, or 0.97 g/cm$^3$.

Flexural Modulus

In some embodiments, the molded-in-color thermoplastic polyolefin-based composition has a flexural modulus (ISO 178) from about 600 to about 2000 MPa; alternatively from about 600 to about 1250 MPa; alternatively from about 1000 to about 1650 MPa; alternatively from about 1350 to about 2000 MPa; alternatively from about 1000 to about 1075 MPa; and alternatively from about 1500 to about 1600 MPa. In specific embodiments, the molded-in-color thermoplastic polyolefin-based composition has a flexural modulus of about 600, 650, 700, 750, 800, 850, 900, 950, 1000, 1025, 1050, 1075, 1100, 1125, 1150, 1175, 1200, 1250, 1300, 1350, 1400, 1450, 1500, 1550, 1600, 1650, 1700, 1750, 1800, 1850, 1900, 1950, or 2000 MPa.

Tensile Yield Strength

In some embodiments, the molded-in-color thermoplastic polyolefin-based composition has a tensile yield strength (ISO 527-1,2) from about 16 to about 26 MPa; alternatively from about 18 to about 25 MPa; alternatively from about 19 to about 24 MPa; and alternatively from about 20 to about 23 MPa. In specific embodiments, the molded-in-color thermoplastic polyolefin-based composition has a tensile yield strength (ISO 527-1,2) of about 16 MPa, 17 MPa, 18 MPa, 19 MPa, 20 MPa, 21 MPa, 22 MPa, 23 MPa, 24 MPa, 25 MPa or 26 MPa.

Notched Izod Impact Strength at 23° C.

In some embodiments, the molded-in-color TPO composition has a notched Izod at 23° C. (ISO 180) from about 20 to about 50 kJ/m$^2$; alternatively from about 25 to 45 kJ/m$^2$; alternatively from about 30 to 43 kJ/m$^2$; and alternatively from about 35 to 42 kJ/m$^2$. In specific embodiments, the molded-in-color TPO composition has a notched Izod at 23° C. of about 20 kJ/m$^2$, about 25 kJ/m$^2$, about 28 kJ/m$^2$, 30 kJ/m$^2$, about 31 kJ/m$^2$, about 32 kJ/m$^2$, about 33 kJ/m$^2$, about 34 kJ/m$^2$, about 35 kJ/m$^2$, about 36 kJ/m$^2$, about 37 kJ/m$^2$, about 38 kJ/m$^2$, about 39 kJ/m$^2$, about 40 kJ/m$^2$, about 41 kJ/m$^2$, about 42 kJ/m$^2$, about 43 kJ/m$^2$, about 44 kJ/m$^2$, about 45 kJ/m$^2$, about 46 kJ/m$^2$, about 47 kJ/m$^2$, about 48 kJ/m$^2$, about 49 kJ/m$^2$ or about 50 kJ/m$^2$.

Notched Izod Impact Strength at 0° C.

In some embodiments, the molded in-color TPO composition has a notched Izod at 0° C. (ISO 180) from about 4 to about 20 kJ/m$^2$; alternatively from about 6 to 18 kJ/m$^2$; alternatively from about 8 to 16 kJ/m$^2$; and alternatively from about 10 to 14 kJ/m$^2$. In specific embodiments, the molded in-color TPO composition has a notched Izod at 0° C. of about 4 kJ/m$^2$, about 5 kJ/m$^2$, about 6 kJ/m$^2$, about 7 kJ/m$^2$, about 8 kJ/m$^2$, about 9 kJ/m$^2$, about 10 kJ/m$^2$, about 11 kJ/m$^2$, about 12 kJ/m$^2$, about 13 kJ/m$^2$, about 14 kJ/m$^2$, about 15 kJ/m$^2$, about 16 kJ/m$^2$, about 17 kJ/m$^2$, about 18 kJ/m$^2$, about 19 kJ/m$^2$, or about 20 kJ/m$^2$.

Notched Izod Impact Strength at −40° C.

In some embodiments, the molded in-color TPO composition has a notched Izod at −40° C. (ISO 180) from about 2 to about 6 kJ/m², and alternatively from about 3.0 to 5 kJ/m². In specific embodiments, the molded in-color TPO composition has a notched Izod at −40° C. of about 2 kJ/m², about 3 kJ/m², about 4 kJ/m², about 5 kJ/m², or about 6 kJ/m².

As-Molded Shrinkage [Modified Version of ISO 294]

In some embodiments, the molded-in-color thermoplastic polyolefin-based composition has an as-molded shrinkage (ISO 294-4) of about 0.6% to about 1.4%; alternatively from about 0.06% to about 1.1%; alternatively from about 1% to about 1.4%; and alternatively from about 0.7 to about 1.1%. In specific embodiments, the molded-in-color thermoplastic polyolefin-based composition has a tool shrinkage of about 0.6%, about 0.7%, about 0.8%, about 0.9%, about 1%, about 1.1%, about 1.2%, about 1.3%, or about 1.4%.

HDT at 1.8 MPa

In some embodiments, the molded-in-color thermoplastic polyolefin-based composition has a HDT at 1.8 MPa (ISO 75) from about 43° C. to about 56° C.; alternatively from about 43° C. to about 49° C.; alternatively from about 45° C. to about 52° C.; alternatively from about 48° C. to about 54° C.; and alternatively from about 50° C. to about 56° C. In specific embodiments, the molded-in-color thermoplastic polyolefin-based composition has a HDT at 1.8 MPa of about 43° C., about 44° C., about 45° C., about 46° C., about 47° C., about 48° C., about 49° C., about 50° C., about 51° C., about 52° C., about 53° C., about 54° C., about 55° C. or about 56° C.

Gloss 60°

In some embodiments, the molded-in-color thermoplastic polyolefin-based composition has a Gloss at 60° (ASTM D 2457) from about 76 to about 90 GU; alternatively from about 80 to 90 GU; alternatively from about 83 to 90 GU; and alternatively from about 85 to 90 GU. In specific embodiments, the molded-in-color thermoplastic polyolefin-based composition has a Gloss at 60° of about 76 GU, about 78 GU, about 80 GU, about 82 GU, about 84 GU, about 86 GU, about 88 GU, or about 90 GU.

Gloss 20°

In some embodiments, the molded-in-color thermoplastic polyolefin-based composition has a Gloss at 20° (ASTM D 2457) from about 68 to about 82 GU; alternatively from about 68 to 75 GU; alternatively from about 72 to 80 GU; and alternatively from about 76 to 82 GU. In specific embodiments, the molded-in-color thermoplastic polyolefin-based composition has a Gloss at 20° of about 68 GU, about 70 GU, about 72 GU, about 74 GU, about 76 GU, about 78 GU, about 80 GU, or about 82 GU.

Gloss 20°

In some embodiments, the molded-in-color thermoplastic polyolefin-based composition has a Gloss at 20° (ASTM D 2457) from about 85 to about 92 GU; alternatively from about 85 to 88 GU; alternatively from about 87 to 90 GU; and alternatively from about 89 to 92 GU. In specific embodiments, the molded-in-color thermoplastic polyolefin-based composition has a Gloss at 20° of about 85 GU, about 86 GU, about 87 GU, about 88 GU, about 89 GU, about 90 GU, about 91 GU, or about 92 GU.

Mar Resistance, % Gloss Retention 20°

In some embodiments, the molded-in-color thermoplastic polyolefin-based composition, after application of a clear coat, has a gloss retention at 20° (FLTM BI 161-01) from about 85% to 93%; alternatively from about 85% to 90%, alternatively from about 87% to 93%; and alternatively from about 89% to 91%. In specific embodiments, the molded-in-color thermoplastic polyolefin-based composition has a gloss retention of about 85%, about 86%, about 87%, about 88%, about 89%, about 90%, about 91%, about 92%, or about 93%.

The molded-in-color thermoplastic polyolefin-based composition's color data (L*, a*, b* and E*) is measured using a X-Rite Ci7800 Spectrophotometer (S/N 001570). In some embodiments, the molded-in-color thermoplastic polyolefin-based composition, or articles produced therefrom, were compared to painted TPO standards prepared using automotive manufacturer's specifications. The molded-in-color thermoplastic polyolefin-based compositions or articles were considered to be color matched to the painted TPO standards when the ΔE was equal to or less than 2 (≤2); alternatively ΔE≤1.5; and alternatively ΔE≤1.

I. Polyolefin

In some embodiments, the molded-in-color thermoplastic polyolefin-based composition includes a polyolefin resin composition having at least one polyolefin, wherein the at least one polyolefin is a homopolymer, copolymer, or other interpolymer. In some embodiments, the combined amount of polyolefins present in the molded-in-color compositions range from about 50 wt % to about 80 wt %, based on the total weight of the molded-in-color thermoplastic polyolefin-based composition.

In some embodiments, the polyolefin resin composition has two polyolefins, wherein the first polyolefin has a high melt flow rate ("high MFR polyolefin") of about 50 to about 200 g/10 min, and second polyolefin has a low melt flow rate ("low MFR polyolefin") of about 1 to 5 g/10 min. The difference between the melt flow rate of the first polyolefin (MFR1) and the melt flow rate of the second polyolefin (MFR2) is at least about 40 grams/10 minutes:

$$|MFR1-MFR2|\geq 40$$

In some embodiments, the high MFR polyolefin is present in the highest weight percentage, ranging from between 48% and 72%, while the low MFR polyolefin is present in an amount between greater than 0 wt % and about 9 wt %. In some of these embodiments, the combined amount for the first and second polyolefin is about 74 wt %, based on the total weight of the composition; alternatively, the combined polyolefin is present in an amount of about 72 wt %; alternatively, the combined polyolefin is present in an amount of about 65 wt %; or alternatively, the combined polyolefin is present in an amount of about 60 wt %.

As mentioned above, the molded-in-color thermoplastic polyolefin-based composition includes the high MFR polyolefin in an amount ranging from about 48% and 72%, based on the total weight of the molded-in-color thermoplastic polyolefin-based composition. In some embodiments, the molded-in-color thermoplastic polyolefin-based composition includes the high MFR polyolefin in an amount ranging from about 48 to about 60 wt %; alternatively from about 58 to about 72 wt %; and alternatively from about 68 to about 73 wt %, based on the total weight of the molded-in-color thermoplastic polyolefin-based composition.

In some embodiments, the molded-in-color thermoplastic polyolefin-based composition includes the low MFR polyolefin in an amount ranging from about 0 to about 9 wt %, based on the total weight of the molded-in-color thermoplastic polyolefin-based composition. In some embodiments, the molded-in-color thermoplastic polyolefin-based composition includes the low MFR polyolefin in an amount ranging from about 1 to about 8 wt %; alternatively from about 5 to about 9 wt %; and alternatively from about 3 to about 8 wt %, based on the total weight of the molded-in-color thermoplastic polyolefin-based composition.

In some embodiments, the polyolefin resin composition may include two different polypropylene homopolymers. The difference in the two polypropylene homopolymers may be found in at least the melt mass flow rate (measured at 230° C. with a 2.16 kg load, ASTM D 1238) of the two polypropylene homopolymers. For example, a first polypropylene homopolymer may be characterized as having a high melt flow rate (MFR=50 to about 130 g/10 min) while the second polypropylene homopolymer may be characterized as having a low melt flow rate (MFR=about 1 to 3 g/10 min).

In some embodiments, the high MFR polyolefin comprises a polypropylene homopolymer having high crystallinity portions. "High crystallinity" refers to polypropylene with a percentage of mesopentad greater than 97% mmmm, as determined by high field NMR. See for example, WIPO PCT Patent Application Publication No. WO 2009/045351, which is incorporated herein by reference. The highly crystalline polypropylene homopolymer has a polydispersity index from about 2 to about 40; alternatively from about 2 to about 20; alternatively from about 2 to about 7.5. The highly crystalline high melt flow rate polypropylene homopolymer may have one or more of the following properties: a density (ASTM D 792) from about 0.900 to about 0.950 gram/cm$^3$; a xylene solubles fraction at room temperature from about 0.001 to about 3 weight percent; a flexural modulus (ASTM D 790) (1.3 mm/min, 1% secant, Procedure A) from about 1500 to about 2500 MPa; a tensile strength at yield (ASTM D 638) (50 mm/min) from about 25 to about 65 MPa; a tensile elongation at yield (ASTM D 638) from about 3 to about 10%; and/or a notched Izod impact strength (ASTM D 256) (23° C., Method A) from about 10 to about 25 J/m.

In some of these embodiments, the high MFR polypropylene homopolymer has a MFR (at 230° C., 2.16 kg) from about 50 g/10 min to about 140 g/10 min; alternatively from about 60 to about 80 g/10 min; alternatively from about 80 to about 120 g/10 min; alternatively from about 110 to about 125 g/10 min; alternatively from about 125 to about 200 g/10 min; and alternatively from about 60 to about 90 g/10 min.

The low MFR polyolefin may comprise a polypropylene homopolymer having high crystallinity portions. In some of these embodiments, the low MFR polyolefin has a MFR (at 230° C., 2.16 kg) from about 1 g/10 min to about 5 g/10 min; alternatively from about 2 to about 4 g/10 min; and alternatively of about 2 g/10 min.

The highly crystalline, low MFR polypropylene homopolymer may also have one or more of the following properties: a polydispersity index from about 2 to about 7.5; a density (ASTM D 792) from about 0.900 to about 0.950 gram/cm$^3$, a xylene solubles fraction at room temperature from about 0.001 to about 2.5 weight percent; a flexural modulus (ASTM D 790) (1.3 mm/min, 1% secant, Procedure A) from about 1500 to about 2400 MPa; a tensile strength at yield (ASTM D 638) (50 mm/min) from about 25 to about 45 MPa; a tensile elongation at yield (ASTM D 638) from about 3 to about 10%; and a notched Izod impact strength (ASTM D 256) (23° C., Method A) from about 30 to about 65 J/m.

The individually-described polyolefins may be prepared by conventional polymerization processes which would be apparent to a person of ordinary skill in the art. Exemplary patents describing such processes include U.S. Pat. Nos. 8,008,400, 8,039,540, and 8,227,550, the contents of which are incorporated herein by reference in their entirety. Alternatively, suitable individual polymers are commercially available through readily identifiable suppliers.

In some embodiments, the thermoplastic polyolefin resin composition includes commercially available polypropylenes, including without limitation ADSTIF™, METOCENE™, and PROFAX™, each available from LyondellBasell Industries (Houston, Tex., USA); or polypropylene homopolymers from Braskem (Philadelphia, Pa., USA).

II. Elastomers

In some embodiments, the molded-in-color thermoplastic polyolefin-based composition may include at least one elastomer. The elastomer may be an ethylene-alpha-olefin copolymer or a polyethylene elastomer. In some embodiments, the ethylene-based elastomer has a density (ASTM D 792) from about 0.850 to about 0.880 g/cm$^3$. In some embodiments, the ethylene-based elastomer is an ethylene copolymer comprising (a) ethylene-derived units and (b) alpha-olefin comonomer units derived from at least one comonomer selected from the group consisting of C3 to C10 alpha-olefins. In specific embodiments, the ethylene-based elastomer comprises ethylene and propylene- or butene-derived units. In other embodiments, the ethylene-based elastomer only has ethylene units.

In some embodiments, the ethylene-based elastomer may have one or more of the following properties: a MFR ranging from 1 to about 5 g/10 min (ASTM D 1238) (2.16 kg at 230° C.); a tensile strength at break (ASTM D 638) ranging from 8 to about 20 MPa; and elongation at break (ASTM D 638) ranging from about 300 to about 900%; a shore A hardness (ASTM D 2240) ranging from about 60 to about 80; a Shore D Hardness (ASTM D 2240) ranging from about 15 to about 30; a glass transition temperature (ASTM E 1356) ranging from about −40 to about −20° C.; a Vicat temperature (ASTM D 1525) from about 15 to about 25° C.; and/or a haze (ASTM D 1003) from about 3 to about 8%.

In some embodiments, the molded-in-color thermoplastic polyolefin-based composition includes a polyethylene-based elastomer in an amount ranging from about 5 to about 25 wt %, based on the total weight of the molded-in-color thermoplastic polyolefin-based composition. In some embodiments, the molded-in-color thermoplastic polyolefin-based composition includes the ethylene-based elastomer in an amount ranging from about 5 to about 15 wt %; alternatively from about 7 to about 12 wt %; and alternatively from about 3 to about 8 wt %, based on the total weight of the molded-in-color thermoplastic polyolefin-based composition.

In some embodiments, the molded-in-color thermoplastic polyolefin-based composition includes a polyethylene elastomer in an amount ranging from about 0 to about 25 wt %, based on the total weight of the thermoplastic polyolefin resin composition. In some embodiments, the thermoplastic polyolefin resin composition includes the polyethylene elastomer in an amount ranging from about 0.1 to about 15 wt %; alternatively from about 1 to about 10 wt %; alternatively from about 2 to about 8 wt %; alternatively from about 3 to about 7 wt %; and alternatively from about 5 to about 10 wt %, based on the total weight of the thermoplastic polyolefin resin composition.

Suitable ethylene-based homopolymer or copolymer elastomers are commercially available from ExxonMobil Corporation under its Vistamaxx® brand, The DOW Chemical Company under its Engage® and Versify® brand, and LyondellBasell Industries under its Catalloy® brand.

III. Compatibilizers

In some embodiments, the molded-in-color thermoplastic polyolefin-based composition further includes a compatibilizer composition having at least one impact-modifying compatibilizer. As the compatibilizer composition is optional, it may be present in an amount of 0 or greater than 0 to about 25 wt %, based on the weight of the molded-in-color thermoplastic polyolefin-based composition.

In some embodiments, the compatibilizer composition comprises at least one styrene-based block copolymer. The styrene-based block copolymer is selected from the group consisting of styrene-isobutylene-styrene block copolymer (SIBS); styrene-butadiene-styrene block copolymer (SBS); styrene-ethylene/butylene-styrene block copolymer (SEBS); styrene-isoprene-styrene block copolymer (SIS); styrene-ethylene-propylene-styrene block copolymer (SEPS); styrene-ethylene-ethylene-propylene-styrene block copolymer (SEEPS structure); and modified block copolymers thereof.

In some embodiments, the compatibilizer composition contains at least a first styrene-based block copolymer and a second styrene-based block copolymer. In some embodiments, the compatibilizer composition includes from about 0.01 to about 99.99 wt % of a first styrene-based block copolymer and about 0.01 to about 99.99 wt % of a second styrene-based block copolymer, based on the total weight of the compatibilizer composition. In some embodiments, the compatibilizer composition includes from about 20 to about 80 wt % of a first styrene-based block copolymer and about 20 to about 80 wt % of a second styrene-based block copolymer; alternatively from about 30 to about 70 wt % of a first styrene-based block copolymer and about 30 to about 70 wt % of a second styrene-based block copolymer; alternatively from about 40 to about 60 wt % of a first styrene-based block copolymer and about 40 to about 60 wt % of a second styrene-based block copolymer; and alternatively from about 45 to about 55 wt % of a first styrene-based block copolymer and about 45 to about 55 wt % of a second styrene-based block copolymer, based on the total weight of the compatibilizer composition.

In some embodiments, the molded-in-color thermoplastic polyolefin-based composition includes from about 0 to about 25 wt % of a first styrene-based block copolymer, based on the total weight of the molded-in-color thermoplastic polyolefin-based composition. In some embodiments, the molded-in-color thermoplastic polyolefin-based composition includes from about 0.1 to about 20 wt % of a first styrene-based block copolymer; alternatively from about 7 to about 18 wt %; and alternatively about 9 to about 14 wt %, based on the total weight of the molded-in-color thermoplastic polyolefin-based composition.

In some embodiments, the molded-in-color thermoplastic polyolefin-based composition includes from about 0 to about 25 wt % of a second styrene-based block copolymer, based on the total weight of the molded-in-color thermoplastic polyolefin-based composition. In some embodiments, the molded-in-color thermoplastic polyolefin-based composition includes from about 0.1 to about 20 wt % of a second styrene-based block copolymer; alternatively from about 1 to about 15 wt %; and alternatively about 5 to about 14 wt %, based on the total weight of the molded-in-color thermoplastic polyolefin-based composition.

In some embodiments, the first styrene-based block copolymer may be a clear, linear triblock styrene-ethylene butylene-styrene block copolymer (S-EB-S) comprising two styrene blocks and one diblock (EB) as the middle block of the triblock copolymer. The first styrene ethylene butylene styrene linear triblock copolymer maybe characterized as an elastomer or may exhibit characteristics that are elastomeric in nature. In some embodiments, the first SEBS polymer may have one or more of the following properties: a polystyrene content of ranging from 5 to about 17%; a diblock (EB) content from about 25 to about 45%; a styrene/rubber ratio from about 5/95 to about 20/80; a MFR (ASTM D 1238) from about 2 to about 11 g/10 min (2.16 kg at 230° C.); a tensile stress at 300% (ASTM D 412) from about 1 to about 5 MPa; a tensile strength at yield (ASTM D 412) from about 15 to about 30 MPa; an elongation at yield (ASTM D 412) from about 650 to about 825%; and/or a shore A hardness from about 40 to about 50 (ASTM D 2240).

In some embodiments, the second styrene-based block copolymer may be a clear, linear triblock styrene-ethylene butylene-styrene block copolymer (S-EB-S) comprising two styrene blocks and one diblock (EB) as the middle block of the triblock copolymer. The second styrene ethylene butylene styrene linear triblock copolymer maybe characterized as an elastomer or may exhibit characteristics that are elastomeric in nature. In some embodiments, the second SEBS polymer may have one or more of the following properties: a polystyrene content from about 15 to about 25%; a MFR (ASTM D 1238) from about 14 to about 25 g/10 min (2.16 kg at 230° C.); a shore A hardness from about 45 to about 55 (ASTM D 2240); a tensile strength from about 5 to about 15 MPa (ASTM D 412); an elongation at break of greater than 600% (ASTM D 412); and/or a styrene/rubber ratio from about 15/85 to about 25/75.

Suitable compatibilizers are commercially available from Kraton Performance Polymer Inc., and Mitsui Chemicals, Inc. under its Tafmer® brand.

IV. Fillers

The molded-in-color thermoplastic polyolefin-based compositions disclosed herein are minimally filled with mineral fillers to allow for ease of colorability and improve the ability of achieve a depth of color not observed in other pre-colored resins. As the fillers are an optional component, they may be present in an amount of 0 or from about 0 to about 7 wt %, based on the weight of the molded-in-color thermoplastic polyolefin-based composition. In some embodiments, the mineral filler is present in an amount ranging from about 2 wt % to about 6 wt %, alternatively from about 4 wt % to about 6 wt %, and alternatively about 5 wt %, where each range and percentage is based on the total weight of the composition.

In some embodiments, the mineral filler may be selected from a talc having a high aspect ratio, glass, glass beads, calcium carbonate, mineral fibers, silica, wollastonite, clay, mica, alumina trihydrate, and combinations thereof (such as talc with mica).

V. Additive Package

In some embodiments, the additive package may comprise one or more of the following additives: antioxidant(s); mold release(s); scratch reduction additive(s); nucleating agent(s); neutralizer(s)/acid scavenger(s) selected from the group consisting of magnesium aluminum hydroxyl carbonate and hydrates thereof; and stearic acid and/or a stearate salt.

In some embodiments, the additive package comprises an antioxidant, wherein the antioxidant is a hindered phenolic antioxidant, an organophosphate, or a blend of a hindered phenolic antioxidant and an organophosphite. Suitable antioxidants are commercially available from BASF under its Irgafos® and Irganox® brands.

In some embodiments, the scratch reduction additive may include lubricants such as fatty amides; examples of which include oleamide ("OR"), ethylene bis-steramide (EBS), and/or erucamide, and the like. For example, the oleamide (OR) may be Crodamide® OR supplied by Croda, Inc (Newark, N.J.); the erucamide (ER) may be Crodamide®

ER supplied by Croda; and the ethylene bis-steramide (EBS) may be Crodamide® EBS supplied by Croda.

In some embodiments, the mold release additive may include one or more of glycerol monostearate, stearic acid, a stearate salt, magnesium stearate, zinc stearate, and the like. See, for example, U.S. Pat. No. 3,886,105, which is incorporated herein by reference for all purposes. Alternatively, magnesium stearate may be used as a dispersion aid.

In some embodiments, the additive package comprises a neutralizer/acid scavenger, wherein the neutralizer/acid scavenger is magnesium oxide, zinc stearate, or magnesium aluminum hydroxy carbonate and hydrates thereof. Magnesium aluminum hydroxy carbonate hydrates are effective in retarding hindered amine light stabilizer deactivation. One magnesium aluminum hydroxy carbonate hydrate for use with the present disclosure is sold under the trademark "DHT-4A or DHT-4V" by Kyowa Chemical Industry Co. Ltd.

In some embodiments, the additive package further comprises one or more ultraviolet (UV) light stabilizers. Suitable UV stabilizers are commercially available from Sovlay under its Cyasorb Cynergy Solutions® brands.

Other additives that can be further included in the present compositions are odorants, deodorants, plasticizers, impact modifiers, nucleating agents, lubricants, surfactants, wetting agents, flame retardants, biocides, metal deactivating agents, thickening agents, heat stabilizers, defoaming agents, coupling agents, polymer alloy compatibilizing agent, blowing agents, emulsifiers, crosslinking agents, waxes, particulates, flow promoters, and other materials added to enhance processability or end-use properties of the polymeric components.

The additives in the additive package may be used in conventional amounts. In some embodiments, the total amount of additives does not exceed 3 wt % of the total weight of the molded-in-color thermoplastic polyolefin-based composition.

In some embodiments, the additives are added individually (or in combination) to the polyolefin composition directly, optionally while the composition is being blended or extruded, such that the additives are distributed approximately evenly throughout the composition. This type of additive addition may be called a "salt and pepper addition." In other embodiments, the additives may be added using a masterbatch. A masterbatch pre-blends (or entrains) additives into a carrier that is blendable with the polyolefin composition. Here, the carrier may be a homopolymer of polyethylene or polypropylene, or a talc. When talc is used as the carrier, equivalent amount of filler is reduced in the formula. The masterbatch may be added while the composition is being blended or extruded such that the additives are distributed approximately evenly throughout the composition. In addition to the additives and fillers, the masterbatch can also include colorants.

One or more masterbatches may be used to introduce the additives to the compositions. In some embodiments, multiple masterbatches may carry different additives. For example, a first masterbatch may carry a filler and a second masterbatch may carry the remainder of the additives. In embodiments using multiple masterbatches, the polymer carrier of each masterbatch may be the same or different. Regardless of the number of masterbatches used, the combined polymer carrier resin may be limited to 0.5-2 wt % of the total weight of the composition; alternatively, the polymer carrier may be about 1 weight percent of the total weight of the composition.

In still further embodiments, some of the additives may be added via a masterbatch route and other additives may be added via a salt and pepper addition.

VI. Colorant Package

One or more colorants such as dye, pigment, or other substance are added to the resin to produce colors that closely match painted TPOs. Any combination can be used as necessary to achieve the desired color. Suitable colorants are commercially available from Sun Chemical, Lansco Colors, Brenntag, Fitz Chem., Huntsman Corporation, Silberline, Eckart, and Cabot Corporation.

In some embodiments, the colorant package combines dyes and pigments with substances that impart metallic and pearlescent effects.

The colorants may be used in conventional amounts. In some embodiments, the total amount of colorants do not exceed 8 wt % of the total weight of the molded-in-color thermoplastic polyolefin-based composition. In other embodiments, the molded-in-color polyolefin-based composition may contain 0 or about 0 to 7.0 wt % of metallic pigments, alone or in combination with other colorants, based on the total weight of the molded-in-color polyolefin-based-composition.

In some embodiments, the molded-in-color thermoplastic polyolefin-based composition may contain 0.4 to 0.6 wt %, of carbon black based on the total weight of the molded-in-color thermoplastic polyolefin-based composition.

In some embodiments, the molded-in-color thermoplastic polyolefin-based composition may contain 0 to 0.1 wt %, of a green pigment, based on the total weight of the molded-in-color thermoplastic polyolefin-based composition.

In some embodiments, the molded-in-color thermoplastic polyolefin-based composition may contain 0 to 0.1 wt %, of a blue pigment, based on the total weight of the molded-in-color thermoplastic polyolefin-based composition.

In some embodiments, the molded-in-color thermoplastic polyolefin-based composition may contain 0 to 0.1 wt %, of a red pigment, based on the total weight of the molded-in-color thermoplastic polyolefin-based composition.

In some embodiments, the molded-in-color thermoplastic polyolefin-based composition may contain 0 to 0.3 wt %, of a white pigment, based on the total weight of the molded-in-color thermoplastic polyolefin-based composition.

VII. Molded Parts/Articles

In another aspect, there are provided articles of manufacture comprising one or more of the compositions disclosed herein. In some embodiments, the article is a part of an automobile, such as a molded part but may also include water vessels, locomotives, recreational vehicles, airplanes and other products. In some embodiments, the molded part is a bumper fascia, a bumper, a rocker, a cladding, a wheel flare, a door panel, or an instrument panel. In some embodiments, such molded parts may be used to assist the automotive industry in their pursuit of manufacturing lower weight cars with improved fuel efficiency and lower emissions. In some embodiments, the molded parts disclosed herein exhibit a property profile of current higher density compositions, e.g., those used for current bumper fascia resins. Such properties include, for example, consistent shrinkage properties, while exhibiting a reduced density. In contrast to other lower density compositions known in the art, the compositions provided herein do not reduce stiffness or impact at room temperature or below, e.g. −30° C. Additionally, compositions provided herein do not result in an increase in shrinkage. In some embodiments, the compositions (resins) provided herein are compatible with existing tooling and would therefore not require any or only limited retooling expense.

In some embodiments, the articles may undergo priming with an adhesion promoter to facilitate adding a clear coat. In still further embodiments, the articles may be coated with a clear seal without the intermediate adhesion promoter layer. The clear seal (alone or in combination with the adhesion promoter) may protect the article from elements such as sun, heat, wind, rain, road debris including dirt and bugs, tree pollen or sap, and/or bird droppings, while imparting gloss.

Another aspect of the disclosure are methods of making an injection molded article (e.g., of an automobile) comprising melt blending the constituents (a), (b), (c), and (d):
(a) a polyolefin composition comprising
 (i) at least one polyolefin present in an amount ranging from about 55 wt % to about 72 wt %, based on a total weight of the composition, or
 (ii) two polyolefins, wherein the first polyolefin has a high MFR that is from about 50 to about 200 g/10 min, and the second polyolefin has a low MFR that is from about 1 to about 5 g/10 min, wherein the amount of the polyolefin composition present in an amount ranging from about 55 wt % to about 72 wt %, based on a total weight of the composition;
(b) at least one elastomer, wherein the total amount of elastomer present in the composition ranges from about 5 wt % to about 25 wt %, based on a total weight of the composition;
(c) a colorant package present in an amount ranging from greater than 0 wt % to about 8 wt %, based on a total weight of the composition; and
(d) an additive package present in an amount ranging from greater than 0 wt % to about 2 wt %, based on the total weight of the composition,
wherein the composition has a density ranging from about 0.89 to about 0.97 g/cm$^3$, a melt mass flow rate between 15 g/10 min to about 40 g/10 min, an as molded shrinkage ranging from about 0.6% to about 1.4%, a flexural modulus between about 600 MPa and about 2000 MPa, and a gloss of from about 76 to about 90 GU (measured at 60°).

In some embodiments, at least one compatibilizer is melt blended with the composition, wherein the total amount of compatibilizer present in the composition ranges from about 5 wt % to about 25 wt %, based on a total weight of the composition. Alternatively, or in addition to, a mineral filler present in an amount up to 7 wt %, based on the total weight of the composition is also melt blended with the composition.

In some embodiments, the methods comprise pelletizing the melt blend to form a plurality of pellets. In some embodiments, the methods comprise injection molding the pelletized blend. In some embodiments, the constituents are blended with an extruder such as a high-intensity continuous mixer or an internal batch mixer (Banbury mixer, or a twin-screw extruder).

EXAMPLES

The following examples are included to demonstrate embodiments of the appended claims using the above described compositions. These examples are intended to be illustrative only, and not to unduly limit the scope of the appended claims. Those of skill in the art should appreciate that many changes can be made in the specific embodiments which are disclosed and still obtain a like or similar result without departing from the spirit and scope of the disclosure herein. In no way should the following examples be read to limit, or to define, the scope of the appended claims.

Materials. Examples 1-3 described below in Table 1 were prepared using a base formulation that includes: (1) a polyolefin resin blend (Polyolefin A, Polyolefin B and/or Polyolefin C); (2) at least one compatibilizer (SEBS A and/or SEBS B); (3) an elastomer (Elastomer A or Elastomer B); (4) an additive package (antioxidants, UV light stabilizers, anti-scratch agents, and acid scavengers); and (5) a colorant package. Example 3 also includes a talc filler. The additives and colorants were varied to achieve a target color, gloss, and other physical properties for each mixture of polymers. The weight percentages in Table 1 were calculated using the total weight of each Example's composition.

Polyolefin A is a high crystalline polypropylene with a MFR of 65 g/10 min (2.16 kg at 230° C.). In particular, Polyolefin A is a high melt flow, nucleated polypropylene homopolymer having a density of 0.9 g/cm$^3$ (at 23° C.), a flexural modulus (1.3 mm/min, 1% secant, Procedure A) of 2000 MPa, a tensile strength at yield (50 mm/min) of 42 MPa, tensile elongation at yield of 6%, and a notched Izod impact strength (23° C., Method A) of 16 J/m.

Polyolefin B is a high crystalline polypropylene with a MFR of 115 g/10 min (2.16 kg at 230° C.). In particular, Polyolefin B is a high melt flow, nucleated polypropylene homopolymer having a density of 0.9 g/cm$^3$ (at 23° C.), a flexural modulus (1.3 mm/min, 1% secant, Procedure A) of 2068 MPa, a tensile strength at yield (50 mm/min) of 41 MPa, tensile elongation at yield of 4.5%, and a notched Izod impact strength (23° C., Method A) of 16 J/m.

Polyolefin C is a high crystalline polypropylene with a MFR of 2.5 g/10 min (2.16 kg at 230° C.). In particular, Polyolefin C is a low melt flow, homopolymer of polypropylene having a density of 0.9 g/cm$^3$ (at 23° C.), a flexural modulus (1.3 mm/min, 1% secant, Procedure A) of 1900 MPa, a tensile strength at yield (50 mm/min) of 37 MPa, tensile elongation at yield of 8%, and a notched Izod impact strength (23° C., Method A) of 53 J/m.

Styrene-Ethylene/Butylene-Styrene A, or SEBS A, is a clear, linear triblock copolymer based on styrene and ethylene/butylene. SEBS A has a polystyrene content of 13%, a diblock content of 30 to 35%, a styrene/rubber ratio of 13/87, a MFR of 22 g/10 min (5.0 kg at 230° C.), a tensile stress at 300% of 2.41 MPa, tensile strength at yield of 23.4 MPa, elongation at yield of 750%, and a shore A hardness 47 (ASTM D 2240). An example of such SEBS is the commercially available Kraton G-1657 from Kraton.

Styrene-Ethylene/Butylene-Styrene B, or SEBS B, is a clear, linear triblock copolymer based on styrene and ethylene/butylene. SEBS B has a polystyrene content of 20%, a styrene/rubber ratio of 20/80, a MFR of 14-25 g/10 min (2.16 kg at 230° C.), a tensile strength of 10.3 MPa (ASTM D 412), an elongation at yield of greater than 600% (ASTM D 412), and a shore A hardness of 52 (ASTM D 2240). An example of such SEBS is the commercially available Kraton G-1643 from Kraton.

Elastomer A is a polyethylene-propylene copolymer with a MFR of 2 g/10 min (2.16 kg at 230° C.). This polyethylene-based elastomer has a density of 0.863 g/cm$^3$, a tensile strength at break of 16.2 MPa, elongation at yield of 710%, a shore A hardness of 75, a Shore D Hardness of 22, a glass transition temperature of −30° C., a Vicat temperature of 20° C., and a Haze of 5.3%. An example of such elastomer is the commercially available Versify 2400 from Dow.

Elastomer B is a polyethylene-butene copolymer with a MFR of 1.2 g/10 min (2.16 kg at 190° C.). This polyethylene-based elastomer has a density of 0.862 g/cm³, an elongation at yield that is greater than 600%, a shore A hardness of 52, a Shore D Hardness of 12, and a glass transition temperature of −58° C. An example of such elastomer is the commercially available Engage 7467 from Dow.

In the examples below, the additive package includes antioxidants, UV light stabilizers, anti-scratch agents, and acid scavengers in various combinations and amounts.

Antioxidant A is Irganox B-225 (a blend of a hindered phenolic antioxidant and an organophosphate); Antioxidant B is Irganox 1076 (a hindered phenolic antioxidant); and Antioxidant C is Irgafos 168 (an organophosphate) which also functions as a processing aid. All three antioxidants are commercially available from BASF. UV light Stabilizer A is Cynergy V703 from Solvay, and the anti-scratch agent is erucamide. The acid scavengers that were used in Examples 1-3 are magnesium oxide, zinc stearate, and DHT-4A.

In the examples below, the colorant package used a variety of commercially available pigments available from Birla Carbon, Sun Chemical, Ferro, FitzChem, Huntsman, and Lansco.

The amounts of pigments in the colorant package were varied in all three examples to best match the color of painted TPOs. Example 1 matches a painted black color, and Examples 2 and 3 match painted white colors that are commonly used in the automotive industry.

For each example, the materials in Table 1 were compounded in a 133 mm Century TS extruder.

Molded-in-color Composition Characterization. Physical properties of the compositions of Examples 1-3 were determined using the test methods described above in the section entitled "Test Methods", and the following instrumentation.

Gloss—The gloss of each composition was measured using a Zehntner ZGM 1130 (S/N 521721130). Prior to collecting sample gloss data, the gloss meter was calibrated using the provided black standard sample. The gloss meter was calibrated at a 20°, 60°, and 85° geometry. After calibration, a plaque of each composition was prepared. The plaque to be analyzed was gently wiped clean to remove any smudges, dust, or fingerprint marks and then placed on a level surface. The gloss meter was placed on top of the plaque and set to measure at 20° and 60° geometry. The plaque was measured for gloss at several different locations (typically 3-4 locations, alternating with mold-flow/against mold-flow). Gloss measurements were averaged, with the final average being reported in Tables 2-4.

Analysis of the injection molded-in-color article, both before and after application of a clear coat, and comparison articles was similar. The article to be analyzed was gently wiped clean to remove any smudges, dust, or fingerprint marks and then placed on a level surface. The gloss meter was placed on top of the article and set to measure at 20° geometry. The article was measured for gloss at several different locations and averaged, with the final average being reported in Tables 3 and 4.

Color—The color for each composition is defined using the CIE color coordinates and was measured using a X-Rite Ci7800 Spectrophotometer (S/N 001570). The spectrophotometer was calibrated using provided white tile standard and a black trap standard. After calibration, a color reading on a green standard was measured to validate the calibration.

TABLE 1

Compositions for Examples 1-3

| Category | Raw Material | Example 1: Unfilled High Gloss Black | Example 2: Unfilled High Gloss White | Example 3: 5% Talc Filled High Gloss White |
|---|---|---|---|---|
| Polyolefin | Polyolefin A (PP homopolymer, 65 MFR) | 70.565 | 69.141 | — |
| | Polyolefin B (PP homopolymer, 120 MFR) | — | — | 53.949 |
| | Polyolefin C (PP homopolymer, 2 MFR) | 3 | 2.5 | 7.3 |
| Compatibilizer | SEBS A | 11 | 11 | 5 |
| | SEBS B | 8 | 8 | — |
| Elastomers | Elastomer A (ethylene-propylene copolymer) | 6 | 6 | — |
| | Elastomer B (ethylene-butene copolymer) | — | — | 25 |
| Filler | High aspect ratio talc. < 1.3 μm median diameter | — | — | 5 |
| Additives | Antioxidant A | 0.2 | 0.2 | — |
| | Antioxidant B | — | — | 0.2 |
| | Antioxidant C | — | — | 0.1 |
| | UV Stabilizer A | 0.3 | 0.3 | 0.3 |
| | Erucamide | 0.4 | 0.4 | 0.5 |
| | Zinc Stearate | — | — | 0.2 |
| | Magnesium Oxide | — | — | 0.1 |
| | DHT-4A | 0.05 | 0.05 | — |
| Colorant | Black Colorant 1 | 0.44 | — | — |
| | Green Colorant 1 | 0.045 | — | — |
| | White Colorant 1 | — | 2.4 | 2.335 |
| | Blue Colorant 1 | — | 0.005 | 0.006 |
| | Black Colorant 2 | — | 0.003 | — |
| | Red Colorant 1 | — | 0.001 | — |
| | Green Colorant 2 | — | — | 0.009 |
| | Black Colorant 3 | — | 0.003 | 0.001 |

Prior to measuring each sample, a color standard, in this case the target painted color master, needs to be read in order to calculate ΔL, Δa, Δb, and ΔE. The color standard was positioned on the front of the spectrophotometer and clamped into place, ensuring no auxiliary light enters the spectrophotometer and skews the reading. The color standard was read, and data was collected on: L (lightness); a (green/red); and, b (blue/yellow).

Each sample was then measured in the above fashion. Measurements were taken at 3-5 different locations and the values were averaged and shown in Table 5. The sample color data was compared to the color standard and values of ΔL, Δa, Δb, and ΔE were calculated.

Results. Tables 2-4 display the results of the physical property measurements. Table 5 displays the color coordinates for each Example as compared to a painted color master.

Table 2 displays the results of the physical property measurements of each pre-mold composition without a clear coat. Despite the variation in the chosen polymers, additives, and colorants, each exemplary composition achieved the required density, flexural modulus, mold shrinkage, and high gloss properties for automotive applications. This is especially true for Examples 1 and 2, which had no filler. Their physical properties were very similar to Example 3, which had 5% of talc as a filler. Further, the color of the molded-in-color articles matched well with the painted color master TPOs, as shown in Table 5.

TABLE 2

Physical Property Performance of in-color compositions

| Property | Method | Example 1 | Example 2 | Example 3 |
|---|---|---|---|---|
| MFR (g/10 min) | ASTM D 1238 | 32 | 30 | 32 |
| Ash Content (%) | ASTM D 5630 | 0.0 | 2.4 | 7.4 |
| Density (g/cc) | ISO 1183-1 | 0.91 | 0.91 | 0.94 |
| Flexural Modulus (MPa) | ISO 178 | 1025 | 1050 | 1581 |

TABLE 2-continued

Physical Property Performance of in-color compositions

| Property | Method | Example 1 | Example 2 | Example 3 |
|---|---|---|---|---|
| Tensile Strength at Yield (MPa) | ISO 527-1,2 | 24.5 | 25 | 21.6 |
| Notched Izod Impact Strength at +23° C. (KJ/m$^2$) | ISO 180 | 42 | 40 | 35 |
| Notched Izod Impact Strength at +0° C. (KJ/m$^2$) | ISO 180 | 12.4 | 10.4 | 18.7 |
| Notched Izod Impact Strength at −40° C. (KJ/m$^2$) | ISO 180 | 3.0 | 3.3 | 4.7 |
| Mold Shrinkage (%) | Modified version of ISO 294-4 | 1.10 | 1.10 | 0.72 |
| HDT at 1.8 MPa (° C.) | ISO 75 | 51 | 52 | 52 |
| Gloss at 20° (GU) | | 78 | 77 | 75 |
| Gloss at 60° (GU) | | 86 | 85 | 86 |

Further improvements to gloss and durability for the molded-in-color compositions can be obtained by adding a clear coat onto the compositions. Examples 1 and 3 were molded before being primed and clear coated by one of four methods:

Clear Coat Method 1—Primed by flame treatment then coated with R788 clearcoat from NB Coatings.

Clear Coat Method 2—Primed by flame treatment then applying a HSRG Clear Adhesion Promoter before coated with R788 clearcoat, both from NB Coatings.

Clear Coat Method 3—Primed by applying a HSRG Clear Adhesion Promoter then coated with R788 clearcoat, both from NB Coatings.

Clear Coat Method 4—Primed by applying a Clear Primer from Quality Coatings, then coated with R788 clearcoat from NB Coatings.

Most primers and adhesion promoters are grey in color. However, clear primers and adhesion promoters were used to maintain the high gloss and color matching aspect of the base composition of the present examples.

The Mar Resistance of the clear coated molded-in-color examples was measured, and the results are shown in Table 3.

TABLE 3

Mar Resistance of High Gloss Solutions

| Gloss Angle | Property | Unit | Painted TPO: TYC 1152X painted with 4WFA Base coat | Example 1: As Molded | Example 1 with Clear Coat Met. 4 | Example 3: As molded | Example 3 with Clear Coat Met. 4 |
|---|---|---|---|---|---|---|---|
| 20° | Initial Gloss | GU | 89.2 | 77.5 | 89 | 74.9 | 87 |
| | Gloss after Mar | GU | 75.6 | 48.7 | 81.7 | 34.2 | 79.9 |
| | Gloss Retention | — | 84.7% | 62.8% | 91.8% | 45.7% | 91.8% |

Met.—method

Even though the molded-in-color compositions of Examples 1 and 3 have a very high initial gloss (>70 GU at 20°), the clear coats increased the gloss for both examples to 87 GU or higher. Even after marring, the gloss still remained around 80 GU, with a gloss retention of 91.8% for both clear coated compositions. This improved gloss and durability for the molded-in-color part will be highly valued by automotive manufacturers because it reduces the cost, time, and resources needed to add the paint layers.

Table 3 also displays the results for a TPO painted with an oxford white 4WFA base coat. The underlying paintable TPO was Hifax TYC 1152X (from LyondellBasell). This paintable TPO is very similar to the Examples 1-3 and has a very high MFR of 30 g/10 min (2.16 kg at 230° C.), a density of 1.01 g/cm$^3$ (at 23° C.), a flexural modulus (1.3 mm/min, 1% secant, Procedure A) of 2000 MPa, and a tensile strength at yield (50 mm/min) of 20 MPa.

As shown in Table 3, the initial gloss for the painted TPO is similar to the clear coated molded-in-color compositions. The gloss retention after Mar, however, is 84.7%. This is about 7.1% lower than the gloss retention for the molded-in-color compositions. Thus, the molded-in-color compositions were not only quicker and cheaper to prepare due to the lack of a painting step, but the gloss after mar and durability were improved over the painted TPO.

Table 4 displays the comparison of the Example 1 composition being molded and clear coated using Clear Coat Methods 1-4. The molded-in-color composition without a clear coat of any kind had an initial gloss of 77.5 GU and a gloss retention after Mar of 62.8%. With each of the clear coating methods, the initial gloss was increased to between 87 and 89 GU. Even after mar, the clear coated molded-in-color compositions retained a high gloss (>70 GU) appearance, with gloss retention being 86% and higher.

The largest gloss retention was observed in the example that was coated with a primer and clear coat (Clear Coat Method 4). However, using a flame treatment to prime the surface followed by a clear coat (Clear Coat Method 1) also has a high retention of gloss value. Thus, the priming step does not seem to affect the ability of the molded-in-color part to retain its gloss after marring.

TABLE 4

Mar Resistance of Various Clear Coating

| Gloss Angle | Property | Unit | Example 1: As Molded | Example 1 with Clear Coat Met. 1 | Example 1 with Clear Coat Met. 2 | Example 1 with Clear Coat Met. 3 | Example 1 with Clear Coat Met. 4 |
|---|---|---|---|---|---|---|---|
| 20° | Initial Gloss | GU | 77.5 | 88 | 87 | 89 | 89 |
|  | Gloss after Mar | GU | 48.7 | 79 | 77.5 | 76.7 | 81.7 |
|  | Gloss Retention | — | 62.8% | 89.85 | 89.1% | 86.2% | 91.8% |

Table 5 displays a comparison of Examples 1 and 3 with their respective painted color masters to determine how close of a color match was achieved by each composition. A ΔE of 1 is generally considered to be barely perceptible by the average human observer. Here, the ΔE for both comparisons were less than 1 and are considered to be an acceptable match.

TABLE 5

Color properties of molded-in-color TPO with respect to painted target

| Color Property | UAWA Painted Master TPO | Ex. 1 (color delta compared to UAWA) | 4WFA Painted Master TPO | Ex. 3 (color delta compared to 4WFA) |
|---|---|---|---|---|
| Color L* (ΔL*) | 24.85 | 24.20 (−0.65 ΔL) | 87.83 | 87.73 (−0.10 ΔL) |
| Color a* (Δa*) | −0.09 | −0.07 (0.02 Δa) | −1.54 | −1.38 (+0.16) |
| Color b* (Δb*) | −0.74 | −0.74 (0.00 Δb) | 0.25 | 0.45 (+0.22 Δb) |
| Color ΔE* | — | 0.65 | — | 0.29 |

"Ex."—Example

As demonstrated by the examples above, it was possible to achieve molded-in-color TPOs that are color matched to painted TPOs and retain a high gloss finish without sacrificing the necessary physical properties (density, flexural modulus, and mold shrinkage) of the TPO.

In all of the above examples, it was shown that a composition that combines a TPO resin, elastomer, and optional compatibilizers and fillers, is capable of a gloss rating of 85 GU at 60°. Further, each composition was easily combined with a specialized colorant recipe to produce a molded-in-color material that mimics a painted TPO color master.

The gloss and durability can be further improved using a clear coat. With high gloss materials, there are difficulties in balancing the gloss level with gloss retention after scratch and marring. The clear coated molded-in-color articles disclosed herein have excellent scratch and mar resistance, and offer at least 89% gloss retention after marring when measured at 20°.

The novel molded-in-color TPO material disclosed herein also meets strict physical requirements set forth by the OEMS. In addition, this molded-in-color TPO does not require further manufacturing steps after injection molding to the part as it already has a high gloss value. However, applying a clear coat further improves the gloss and scratch/mar resistance. Though clear coating the molded-in-color TPO this adds an extra step, it is still an improvement over other TPOs that require further finishing steps such as painting, which requires time, resources, and is more costly.

All of the compositions, articles of manufacture, and methods disclosed and claimed herein can be made and executed without undue experimentation in light of the present disclosure. While the compositions, articles of manufacture, and methods of this disclosure have been described in terms of certain embodiments, it will be apparent to those of skill in the art that variations may be applied to the compositions, articles of manufacture, and methods, as well as in the steps or in the sequence of steps of the methods described herein without departing from the concept, spirit, and scope of the appended claims.

The following references, to the extent that they provide exemplary procedural or other details supplementary to those set forth herein, are specifically incorporated herein by reference for all purposes.

ASTM Standard D 1238, "Test Method for Melt Flow Rates of Thermoplastics by Extrusion Plastometer," approved on Aug. 1, 2013.

ISO 3451-1, "Plastics—Determination of Ash—Part 1: General Methods. ASTM Standard D5630, "Standard Test Method for Ash Content in Plastics," published in February 2019 (ISO 3451-1:2019(E)).

ASTM Standard D3763, "Standard Test Method for High Speed Puncture Properties of Plastics Using Load and Displacement Sensors," approved on Sep. 1, 2015.

International Standard ISO 1183-1, "Plastics—Methods for Determining the Density of Non-Cellular Plastics—Part 1: Immersion method, liquid pycnometer method and titration method," second edition, May 15, 2012.

International Standard ISO 178, "Plastics—Determination of flexural properties," fifth edition, Dec. 15, 2010.

ISO 527-1:2012, which is entitled "Plastics—Determination of tensile properties", published February 2012.

ISO 75, "Plastics—Determination of temperature of deflection under load", published in April 2013.

ISO 180, "Determination of Izod Impact Strength", published in November 2019.

FLTM BI 161-01, "Mar Resistance Determination for Automotive Coatings, published in March 2001.

ASTM D 2457, "Standard Test Method for Specular Gloss of Plastic Films and Solid Plastics" published in 2013.

WO2009/045351

U.S. Pat. No. 5,037,680

U.S. Pat. No. 8,008,400

U.S. Pat. No. 8,039,540

U.S. Pat. No. 8,227,550

U.S. Pat. No. 3,886,105

What is claimed is:

1. A molded-in-color composition comprising:
   a) 50 to 80 wt. %, based on the total weight of the molded-in-color composition, of a polyolefin resin composition;
   b) 5 to 25 wt. %, based on the total weight of the molded-in-color composition, of at least one elastomer;
   c) greater than 0 to 2 wt. %, based on the total weight of the molded-in-color composition, of an additive package;
   d) greater than 0 to 2 wt. %, based on the total weight of the molded-in-color composition, of one or more colorants; and
   e) less than 4 wt. %, based on the total weight of the molded-in-color composition, of a mineral filler, wherein the mineral filler comprises talc, wherein the molded-in-color composition has a $\Delta E^*$ value≤2.0 (compared to a painted color master), a gloss measured at 60° from about 76 to about 90 GU, density from about 0.89 to about 0.97 g/cm$^3$, a melt mass flow rate (MFR) from about 15 to about 40 g/10 min (ASTM D 1238, 230° C./2.16 kg), a flexural modulus between about 600 to about 2000 MPa, an ash content from 0.001 to 8.0 wt. %, based on the total weight of the molded-in-color composition, and an as-molded shrinkage between about 0.6% and about 1.4%.

2. The molded-in-color composition of claim 1, wherein the polyolefin resin composition comprises a first polyolefin having a MFR that is from about 50 to about 200 g/10 min (ASTM D 1238, 230° C./2.16 kg), and a second polyolefin has a MFR that is from about 1 to about 5 g/10 min (ASTM D 1238, 230° C./2.16 kg).

3. The molded-in-color composition of claim 1, further comprising a compatibilizer.

4. The molded-in-color composition of claim 1, wherein the molded-in-color composition has a tensile strength at yield from about 16 to about 26 Mpa.

5. An article formed from the molded-in-color composition of claim 1.

6. The article of claim 5, wherein the article is a part of an automobile.

7. The article of claim 6, further comprising a clear coat.

8. The article of claim 7, wherein the coated article has a gloss at 20° between about 85 to about 95 GU, and a gloss retention after mar between about 85% and about 93%.

9. A method of forming an article comprising:
   a) melt blending the molded-in-color composition of claim 1, and
   b) molding the melt blended molded-in-color composition into an article, wherein said article has a gloss measured at 60° from about 76 to about 90 GU.

10. The method of claim 9, wherein said molded-in-color composition in the step a) further comprises at least one compatibilizer, wherein the total amount of the compatibilizer present ranges from about 5 wt % to about 25 wt %, based on the total weight of the molded-in-color composition.

11. The method of claim 9, wherein said article is a part of an automobile.

12. The method of claim 9, wherein the polyolefin composition comprises a first polyolefin having a MFR that is from about 50 to about 200 g/10 min (ASTM D 1238, 230° C./2.16 kg), and a second polyolefin has a MFR that is from about 1 to about 5 g/10 min (ASTM D 1238, 230° C./2.16 kg).

13. The method of claim 9, further comprising the step of priming said article and coating the primed article with a clear coat, wherein said clear coated article has a gloss measured at 20° from about 85 to about 95 GU and a gloss retention after mar between about 85% and about 93%.

14. The method of claim 13, wherein said article is a part of an automobile.

* * * * *